(No Model.)
C. D. ROGERS.
WOOD SCREW.
No. 449,887. Patented Apr. 7, 1891.
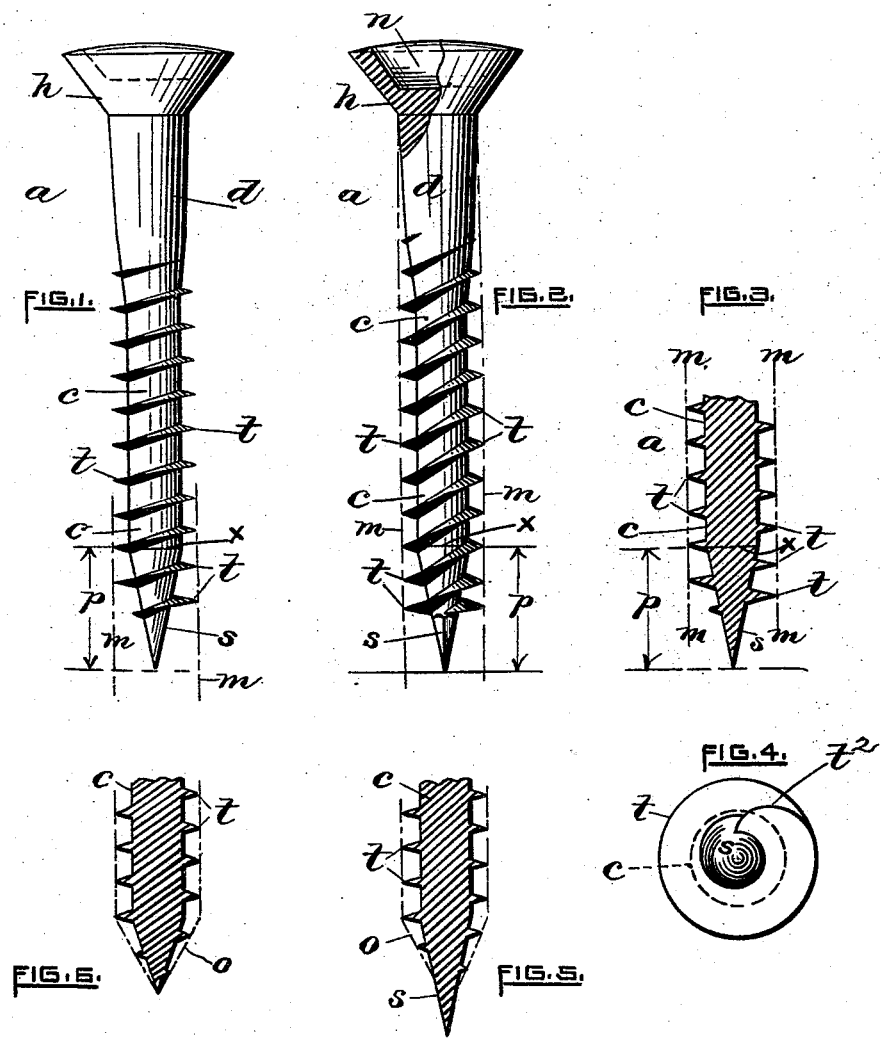
WITNESSES.
Charles H. Hannigan
Hattie E. Carpenter
INVENTOR.
Charles D. Rogers
by Remington & Henthorn
Attys

UNITED STATES PATENT OFFICE.

CHARLES D. ROGERS, OF PROVIDENCE, RHODE ISLAND, ASSIGNOR TO THE AMERICAN SCREW COMPANY, OF SAME PLACE.

WOOD-SCREW.

SPECIFICATION forming part of Letters Patent No. 449,887, dated April 7, 1891.

Application filed November 4, 1890. Serial No. 370,315. (No model.)

*To all whom it may concern:*

Be it known that I, CHARLES D. ROGERS, a citizen of the United States, residing at Providence in the county of Providence and State of Rhode Island, have invented certain new and useful Improvements in Wood-Screws; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to wood-screws, but more particularly to the screw-threads formed on the point portions of such screws.

Heretofore in the manufacture of wood-screws, whether produced by cutting away the stock to form the threads or made by the "rolling" process, so called, the height of the threads formed on the point portions of such screws gradually diminishes from the base of the point, where the full height or depth is attained, to the end of the screw, as in the well-known gimlet-pointed screws. Sometimes the thread vanishes or terminates in the beveled side of the point portion before the actual end is reached, thereby producing an unthreaded end or tip which serves to center the screw upon entering the wood, followed by a screw-thread having a gradually-increasing height which extends rearwardly toward the head until it reaches the base of the point portion, where it (the thread) then unites with and forms a part of the thread formed on the cylindrical or body portion of the screw. An example of this latter screw is shown and described in a patent of the United States granted to me October 29, 1889, and numbered 413,968.

Gimlet-pointed screws as generally made are objectionable in that they will not readily enter the wood unless a hole be first made therein for their reception, and even when screwed home the threads formed on the point portions of such screws possess little, if any, holding-power, owing to their inclination; moreover, such inclination or bevel forms a comparatively blunt point, which acts to prevent the screw from readily entering the wood. Even when driving the screw in the usual manner the threaded blunt point continually ruptures the fibers of the wood as it advances, thereby reducing the holding-power of the entire screw, which is equivalent to a corresponding reduction in the strength of the screw. In the patent referred to some of the disadvantages inherent in gimlet-pointed wood-screws are overcome.

The object I seek to attain in my present invention is to fully overcome the disadvantages before set forth, and in order to effect such improvement my invention consists in providing the point portion of the screw with an unthreaded sharpened entering end or spur, (either conical or pyramidal in form,) and having the other part of the point portion provided with one or more screw-threads integral with the threads formed on the body of the screw, the diameter of the screw on both the said screw-threaded portions being substantially alike. By means of this improvement the screw is rendered stronger by reason of the increased holding power. It enters the wood readily. It is self-centering, and the operation of driving it into the wood ruptures the fibers of the wood to a less extent than heretofore.

In the accompanying drawings, Figure 1 is a side elevation of a single-thread wood-screw embodying my improvement. Fig. 2 is a similar view, in partial section, showing my improved screw provided with a "double thread." Fig. 3 is a longitudinal sectional view taken through the center of the lower portion of the screw shown by Fig. 1. Fig. 4 is an inverted end view of the screw enlarged. Fig. 5 is a central longitudinal sectional view of the lower portion of a wood-screw as heretofore made, the same having an unthreaded spur or end communicating with the other part of the point portion, which is provided with a screw-thread gradually increasing in height until it unites with the thread formed on the body of the screw, and Fig. 6 is a similar sectional view of the ordinary gimlet-pointed wood-screw.

My improved wood-screw is indicated by $a$, $d$ being the plain or unthreaded shank portion of the screw, the same having at its upper end a head $h$, provided with a nick $n$, to receive the blade of a screw-driver, or the screw may be provided with any well-known form of head. The unthreaded shank portion may be cylindrical, although I prefer to make it tapering, substantially as shown, the diameter at its intersection with the head being practically the same as the diameter of the screw taken across the threads. The body of the screw is provided with threads $t$, projecting from the core $c$. The threads may be produced by cutting away the metal, as commonly practiced in the manufacture of "cut screws," or they may be produced by suitably-operated swaging-dies by what is known as the "rolling process." I would state that I consider the last-named method of manufacture the most practical as well as being the most economical.

The inclined sides of the core of the point portion $p$ of the screw I make somewhat longer than usual, the same terminating in an unthreaded sharpened spur-like end $s$, having a conical or pyramidal form, as desired. The screw-threads $t$, formed on the body of the screw, extend past the base $x$ of the point portion $p$ and terminate abruptly at or near the base of the said spur portion $s$, as indicated. (See also $t^2$, Fig. 4.) The threads formed on the point portion have substantially the same diameter as those of the cylindrical or body portion of the screw, as clearly represented, such construction being in marked contrast with the construction and arrangement of the point-threads formed on the well-known gimlet-pointed wood-screws, (see Fig. 6,) or even the threads formed on the point of the screw patented to me, as hereinbefore referred to, and as sectionally represented herewith by Fig. 5. In both the last-named cases the threads gradually increase in height and diameter toward the body of the screw, as indicated by the inclined dotted lines $o$, Figs. 5 and 6, whereas in my present improved screw the thread $t$ at or near its commencement on the point has the greatest height and gradually decreases therefrom to the base $x$, where it then forms a part of the main thread. Its diameter, however, is substantially uniform throughout. (See dotted lines $m\ m$.)

I claim as my invention—

A pointed screw having the thread or threads upon the cylindrical body extended with the same diameter over a part of the surface forming the point.

In testimony whereof I have affixed my signature in presence of two witnesses.

CHARLES D. ROGERS.

Witnesses:
CHARLES HANNIGAN,
GEO. H. REMINGTON.